(12) United States Patent
Politis

(10) Patent No.: US 6,580,836 B2
(45) Date of Patent: *Jun. 17, 2003

(54) SCAN LINE RENDERING OF CONVOLUTIONS

(75) Inventor: George Politis, New South Wales (AU)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,858

(22) Filed: Jan. 21, 1998

(65) Prior Publication Data

US 2002/0085012 A1 Jul. 4, 2002

(30) Foreign Application Priority Data

Jan. 24, 1997 (AU) ................................. 04788

(51) Int. Cl.$^7$ ................................. G06K 9/64
(52) U.S. Cl. ................... 382/279; 345/619; 345/547
(58) Field of Search ................. 382/279, 307, 382/308; 708/420; 345/433, 435, 619–394, 547

(56) References Cited

U.S. PATENT DOCUMENTS

| | | | | |
|---|---|---|---|---|
| 4,328,425 A | * | 5/1982 | Stoffel | 250/578 |
| 4,347,580 A | * | 8/1982 | Bond | 708/440 |
| 4,623,923 A | * | 11/1986 | Orbach | 382/279 |
| 4,720,871 A | * | 1/1988 | Chambers | 382/279 |
| 4,947,446 A | * | 8/1990 | Jutand et al. | 382/279 |
| 5,005,011 A | | 4/1991 | Perlman et al. | 340/728 |
| 5,151,953 A | * | 9/1992 | Landeta | 382/279 |
| 5,241,372 A | * | 8/1993 | Ohba | 382/284 |
| 5,485,568 A | * | 1/1996 | Venable et al. | 345/435 |
| 5,748,178 A | * | 5/1998 | Drewry | 345/138 |
| 5,838,229 A | * | 11/1998 | Smith et al. | 345/138 |
| 5,903,277 A | * | 5/1999 | Sutherland et al. | 345/581 |
| 5,949,920 A | * | 9/1999 | Jordan et al. | 382/279 |

FOREIGN PATENT DOCUMENTS

| WO | WO 92/09947 | 6/1992 | G06F/2/14 |
|---|---|---|---|
| WO | WO 96/35203 | 11/1996 | G09G/1/16 |

* cited by examiner

*Primary Examiner*—Jingge Wu
(74) *Attorney, Agent, or Firm*—Fitzpatrick, Cella, Harper & Scinto

(57) ABSTRACT

A convolution operator is applied to an input image to produce an output image. Image pixel data corresponding to at least a predetermined number of scan lines of the input image is provided to a buffer memory adapted to store a portion of the image. The image data may be provided from a source of such data, or alternatively it may be rendered from an object graphics environment. A finite convolution mask is applied to the image pixel data to produce a scan line of the output image. The finite convolution mask has a plurality of coefficients arranged in a predetermined number of rows and a predetermined number of columns, and the predetermined number of scan lines substantially equals at least one of the number of rows or the number of columns of the convolution mask. In a preferred implementation, a scan line of the input image is discarded and a next scan line is provided for each scan line of the output image produced by the convolution.

41 Claims, 13 Drawing Sheets

1

SCAN LINE RENDERING OF CONVOLUTIONS

FIELD OF THE INVENTION

The present invention generally relates to image convolution techniques and, in particular, to performing convolutions of digital images or object-based graphics in a scan line rendering environment.

BACKGROUND ART

Current image convolution systems perform image convolutions using semiconductor memory frame buffers. However, this has the potential of limiting the size of an image on which convolutions can be applied to what can be stored in available memory, especially where high speed rendering of an image is required. Further, current systems allow convolutions to be applied only to images formed of pixel-based image data, and not in general to images formed from object-based graphic image data.

With reference to FIG. 1, a convolution of an image with an arbitrary mathematical function can be defined as follows. An image 10 can be denoted by a function $I(x,y)$ where x is a position horizontally along a scan line 11 and y is a position vertically down the image 10 from the top left hand corner of the image 10. A pixel 12 with pixel integer coordinates p and q has a value returned by the function $I(x,y)$ in the region $p \leq x \leq p+1, q \leq y+1$. In practice, an image is usually represented as a series of colour components, for example, red, green and blue known as RGB-values. Thus, $I(x,y)$ usually denotes several functions, one for each colour component, $I_R(x,y)$, $I_G(x,y)$ and $I_B(x,y)$. The convolution of the image 10 with a predetermined function $f(x,y)$ is mathematically defined as $$I \otimes f = \int_{-\infty}^{\infty} \int_{-\infty}^{\infty} I(u,v) f(x-u, y-v) du dv, \quad \text{(EQ 1)}$$

where, in theory, f can be defined over any finite or infinite domain. In practical terms, a convolution is usually performed by representing $f(x,y)$ by a finite mask 21 (also known as a kernel) $k_{ij}$, i=−m, ..., m, j=−n, ..., n shown in FIG. 2 and represented so that the centre element, or coefficient of the mask, is the $k_{00}$ element 22. The convolution is calculated at each pixel (p,q) as $$\sum_{i=-m}^{+m} \sum_{j=-n}^{+n} I(p+i, q+j) k_{ij}, \quad \text{(EQ 2)}$$

where the use of I denotes a series of independent calculations on each colour component as required.

FIG. 3 shows a calculation of a convolution in accordance with the finite mask 21 of FIG. 2. Each pixel 31 in an output image 32 depends upon a neighbourhood of a plurality of pixels 33 across a multitude of scan lines of an input image 34. In conventional systems, a full image semiconductor frame buffer is used to store the input image 34 in its entirety, so that there is no difficulty in accessing this neighbourhood region of pixels.

Throughout this specification, unless otherwise noted, a reference to "memory" is to be construed as a reference to high data transfer rate, preferably a low access time memory, such as semiconductor-based random access memory, which provides substantially higher data transfer rates and lower access times than, for example, a hard disc (magnetic) memory or optical disc memory. Other examples of a high data transfer rate, low access time memory include a bubble memory and mercury delay line memory, and the like.

However, the use of a frame buffer for image convolutions, amongst other image manipulation processes, poses a number of problems and disadvantages. Firstly, although the cost of such memory has dropped over the past few years, such memory remains relatively expensive. Hence, the capacity of such memory as typically used in computer systems, it is often consumed by the simultaneous execution of an operating system and one or more application programs all of which tend to use fast memory resources prior to utilizing slow memory (eg. hard disk) for intermediate storage. Further, the provision of a frame buffer encourages the rendering of graphical objects into pixel-based form thus occupying further memory resources and compounding the above noted problem.

It is therefore an object of the present invention to substantially overcome, or ameliorate, one or more difficulties associated with prior art arrangements.

SUMMARY OF THE INVENTION

The present invention provides for the use of scan line buffers (or band buffers) rather than with conventional frame buffers to perform image convolution operations, and such becomes particularly advantageous when dealing with graphical object-based images.

In accordance with one aspect of the present invention there is provided a method of applying a convolution operator to an image, the method comprising the steps of:

(a) providing a finite convolution mask having a plurality of coefficients, wherein the coefficients are arranged in a predetermined number of rows and a predetermined number of columns;

(b) providing a buffer means adapted to store a portion of the image;

(c) rendering to the buffer means at least a predetermined number of scan lines of the image substantially equal to the number of rows or the number of columns of the convolution mask; and (d) applying the convolution mask to the rendered plurality of scan lines to produce a scan line of an output image.

Preferably, steps (c) and (d) are repeated to produce a plurality of scan lines of the output image, wherein at the rendering step (c) a scan line is discarded and a next scan line is rendered for each scan line of the output image.

Most preferably, the image is represented in an object-based graphics environment. In such a case, the image is represented by an expression tree representation comprising a plurality of nodes. Typically the nodes are characterised as being either an operator or a primitive. Alternatively the image may be represented by an instruction sequence or by a hierarchical data representation. Generally one or more nodes of the expression tree or each instruction of the instruction sequence have associated therewith a render number. Typically the render number represents the number of scan lines to be rendered in advance of a current scan line for the node or instruction.

Preferably the coefficients of the mask are determined by an arbitrary function.

According to another aspect of the present invention there is disclosed a method of applying a convolution operator to an input image to produce an output image, the method comprising the steps of:

(a) providing to a buffer means adapted to store a portion of the image, image pixel data corresponding to at least a predetermined number of scan lines of the image; and (b) applying a finite convolution mask to the image pixel data to produce a scan line of the output image, wherein the finite convolution mask has a plurality of coefficients arranged in a predetermined number of rows and a predetermined number of columns and the predetermined number of scan lines substantially equals at least one of the number of rows or the number of columns of the convolution mask.

According to another aspect of the present invention there is disclosed a method of applying a convolution operator to an image represented at least graphical object in an object-based graphics environment, the method comprising the steps of:

(a) providing a finite convolution mask having a plurality of coefficients, wherein the coefficients are arranged in a predetermined number of rows and a predetermined number of columns;

(b) providing a buffer means adapted to store a portion of the image;

(c) rendering at least a predetermined number of scan lines of the at least one graphical object to the buffer means, the predetermined number of scan lines being substantially equal to the number of rows or the number of columns of the convolution mask;

(d) applying the convolution mask to the rendered plurality of scan lines to produce a scan line of an output image.

(e) repeating steps (c) and (d) to produce a plurality of scan lines of the output image, wherein at the rendering step (c) a scan line is discarded from the buffer means and a next scan line is rendered for each scan line of the output image.

According to another aspect of the present invention there is disclosed apparatus for applying a convolution operator to an image, the apparatus comprising:

first means for providing a finite convolution mask having a plurality of coefficients, wherein the coefficients are arranged in a predetermined number of rows and a predetermined number of columns;

buffer means adapted to store a portion of the image;

second means for providing to the buffer means image pixel data of at least a predetermined number of scan lines of the input image, the predetermined number of scan lines being substantially equal to the number of rows or the number of columns of the convolution mask; and third means for applying the convolution mask to the plurality of scan lines to produce a scan line of an output image.

Preferably, for each aspect, the buffer means is configured to retain a limited portion of the input image substantially smaller than an entirety of the input image.

The construction of an output image on a scan line basis, or optionally on a band-by-band basis with each band comprising a plurality of scan lines, is advantageous where a reduction in memory storage capacity is necessary or desirable. Similarly, it is often preferable to store only a portion of an input image, for example only a minimum number of scan lines of the input image required for performing a convolution operation, as described hereinafter.

BRIEF DESCRIPTION OF THE DRAWINGS

Some aspects of the prior art and a number of embodiments of the present invention will now be described with reference to the accompanying drawings, in which.

DETAILED DESCRIPTION

Figure 4:
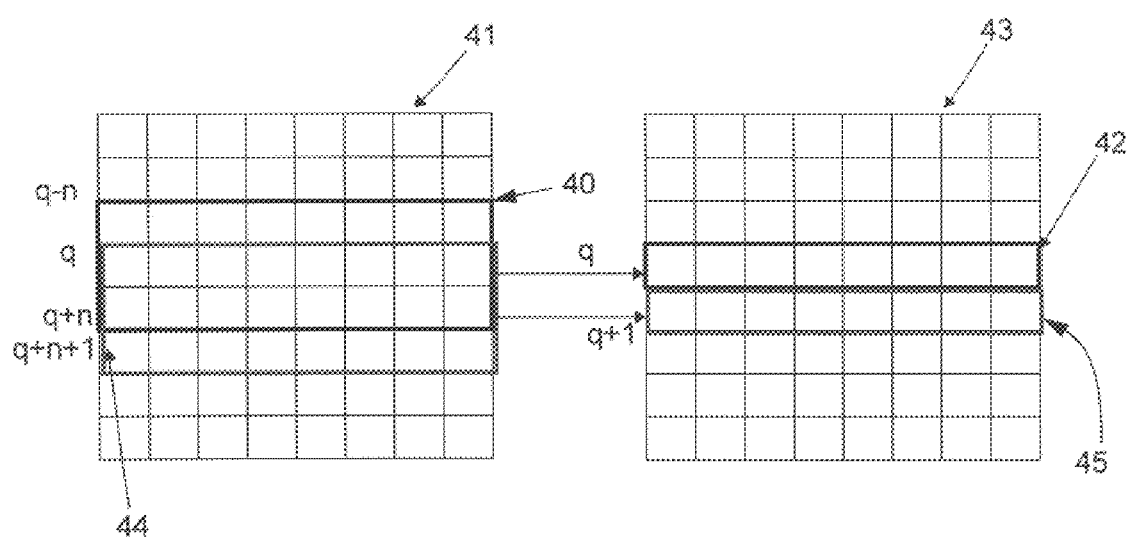
FIG. 4 is a schematic representation of scan line convolutions wherein a band of input image convolves to a single scan line output in accordance with an embodiment of the present invention.

FIG. 4 shows an example of a current band 40 of an input image 41 which upon processing in accordance with an embodiment of the present invention results in a construction or formation of a single current scan line 42 of an output image 43. Consequently, the current band 40 of the input image 41 and the current scan line 42 of the output image 43 represent preferred portions of the input image 41 and output image 43 respectively that require storing in memory. Whether the input image 41 is generated by software (ie. rendered, for example from graphic objects) or read into memory from an external source (eg. pixel-based data from a hard disk, scanner, CD-ROM, etc.), only a portion of the input image 41 requires storage in memory in order to perform a convolution. For a convolution mask (N×M) having "N" rows and "M" colunm elements, the preferred portion of the input image stored in memory comprises N scan lines. However, a portion of each of the N scan lines will suffice to perform a convolution in accordance with the embodiment of the present invention.

Figure 1:
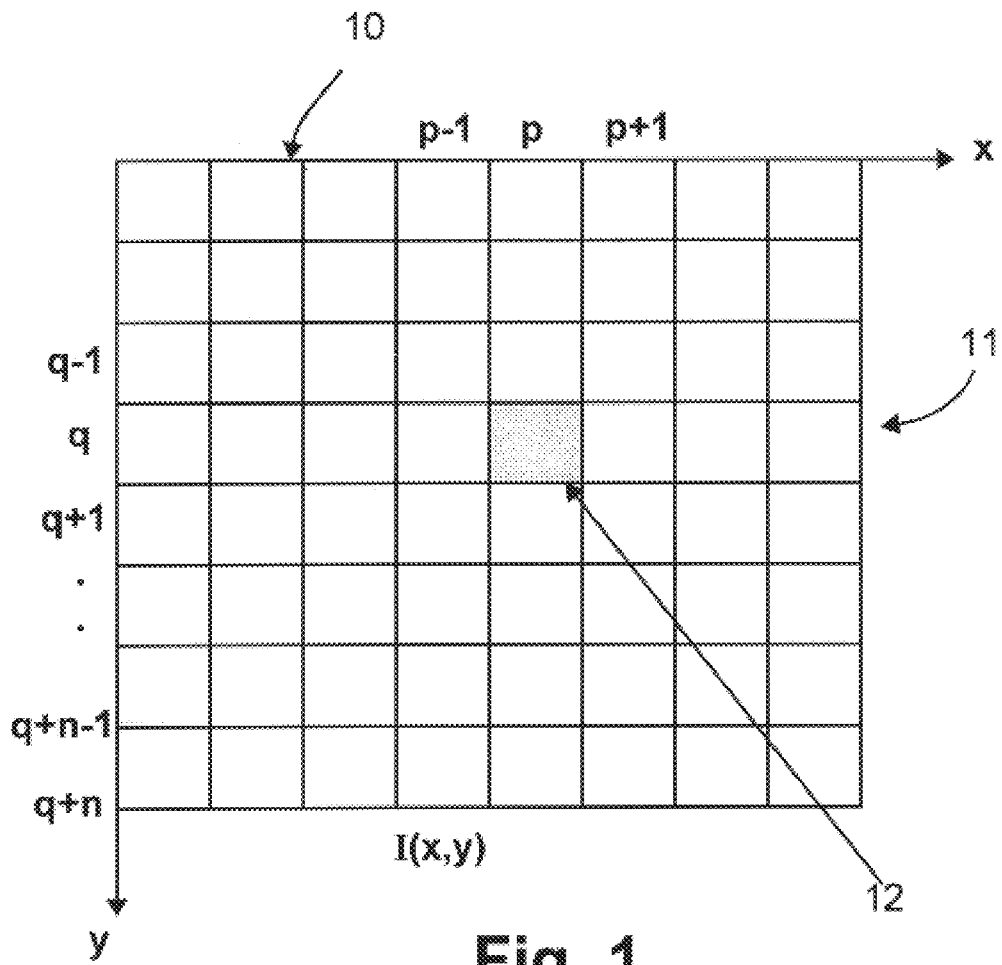
FIG. 1 represents a digital image comprising a plurality of pixels addressed by integer coordinates (p, q) and spatial coordinates (x, y)
Figure 2:
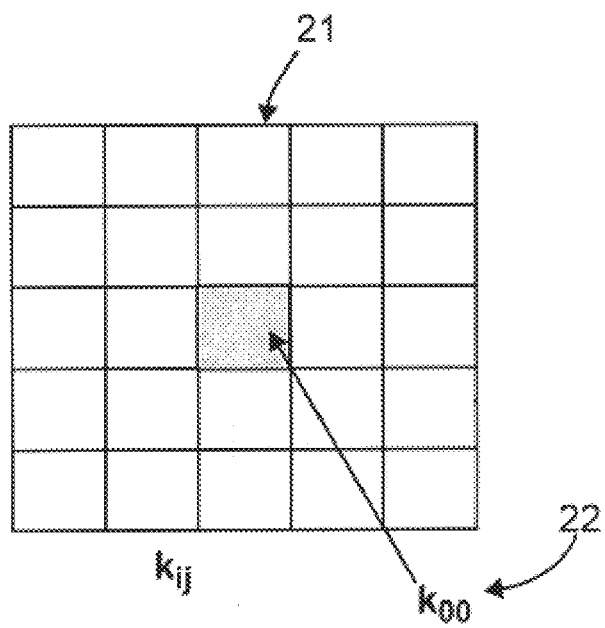
FIG. 2 is a schematic representation of a convolution mask.
Figure 3:
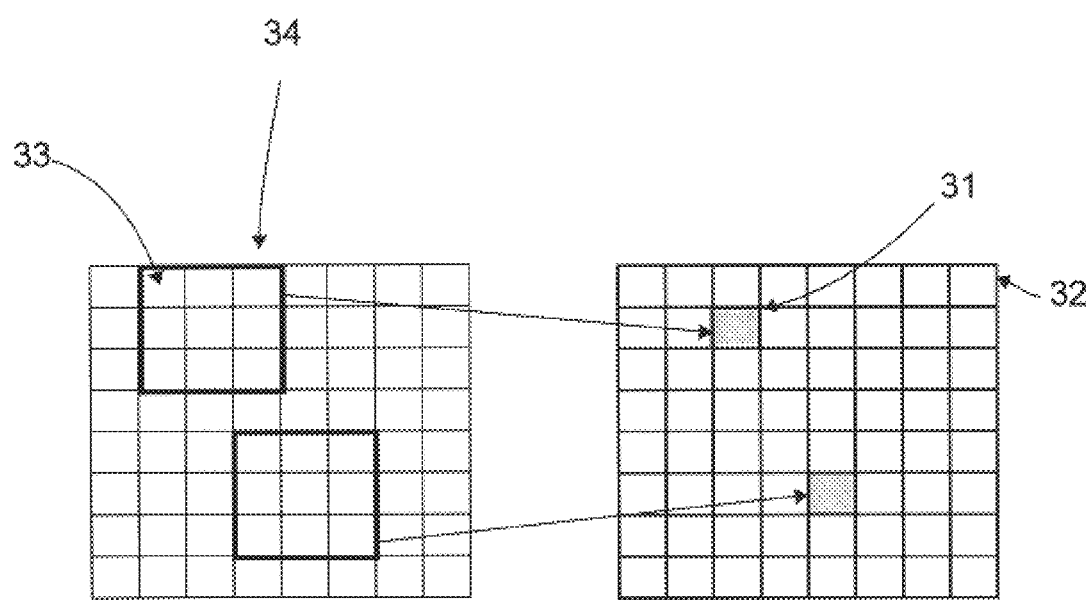
FIG. 3 represents prior art convolution of an image using frame buffers.

While "N" and "M" can take on any positive integer value depending on the size of the convolution mask 21, it is preferable to choose "N" and "M" to be odd positive integers so that the centre element "$k_{00}$" 22 (seen for example in FIG. 2) resides at the geometric centre of the convolution mask.

As an illustrative example of a convolution mask having "2n+1" rows and "2m+1" columns, where "n" and "m" represent arbitrary positive integers, a plurality of scan lines 40 (eg. a band) of the input image 41 are required to be stored in memory for processing to form a single scan line 42 of the output image 43. For the present example, scan lines "q−n" through to "q+n" are required to be stored in memory to output a scan line "q" 42 of the output image 43. Upon processing the band 40 using the convolution mask, to output the scan line "q" 42 of the output image, scan line "q−n" of the band 40 is discarded from memory and scan line "q+n+1" is read into memory. The band 40 has now advanced one scan line to form a new band 44 comprising scan lines "q−n+1" through to "q+n+1". The new band 44 is processed, using the convolution mask, to produce a scan line 45 "q+1" of the output image 43. When an output scan line is generated (eg. output scan line "q" 42), the scan line is output, for example sent to a display device or a storage medium, and the process described above is continued for all output scan lines until a desired output image is achieved.

In an object-based graphic environment, an image is described by a series of graphical primitives connected by operators. Such primitives typically include: geometrically defined shapes, whether simple like boxes and circles or complex such as parametric spline curves; text; or digital pixel-based images.

Figure 5:
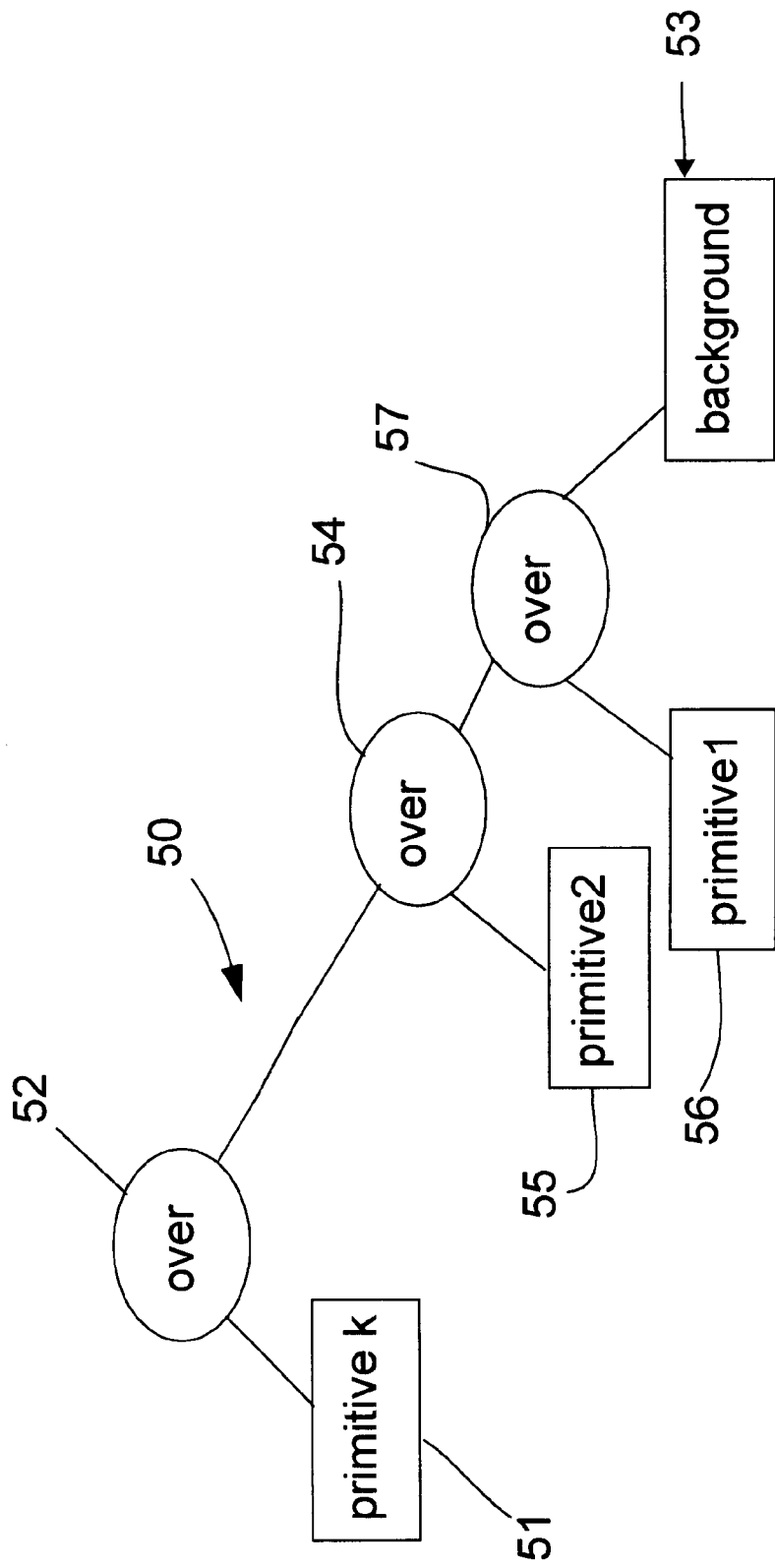
FIG. 5 illustrates an expression tree representation of a simple object-based graphics image.

In a simple example of object based graphics as shown in FIG. 5, primitives 51, 55 and 56 are composited in a predetermined order with a background 53 using, for example, "over" operators 52, 54 and 57, giving an hierarchical "expression tree" representation 50 for such a process. Compositing operators other than the "over" operator are optionally available for the construction of more complex expression tree representation than depicted in FIG. 5. These operators include compositing operators set out in Table 1 below, where Dc is the premultiplied destination or resultant colour, Do is the destination or resultant α channel value, Ac is the premultiplied pixel colour of a first portion of a first source A, Ao is the value corresponding to the pixel whose colour is Ac, Bc is the premultiplied pixel colour value of a portion of an image of a second source B, and Bo is the α channel value of the pixel corresponding to Bc of the source B. Table 1 specifically shows various compositing methods for combining two different images together utilising different operators. Additional operators are also possible. The various operators can be mainly utilized to implement special effects.

Figure 6:
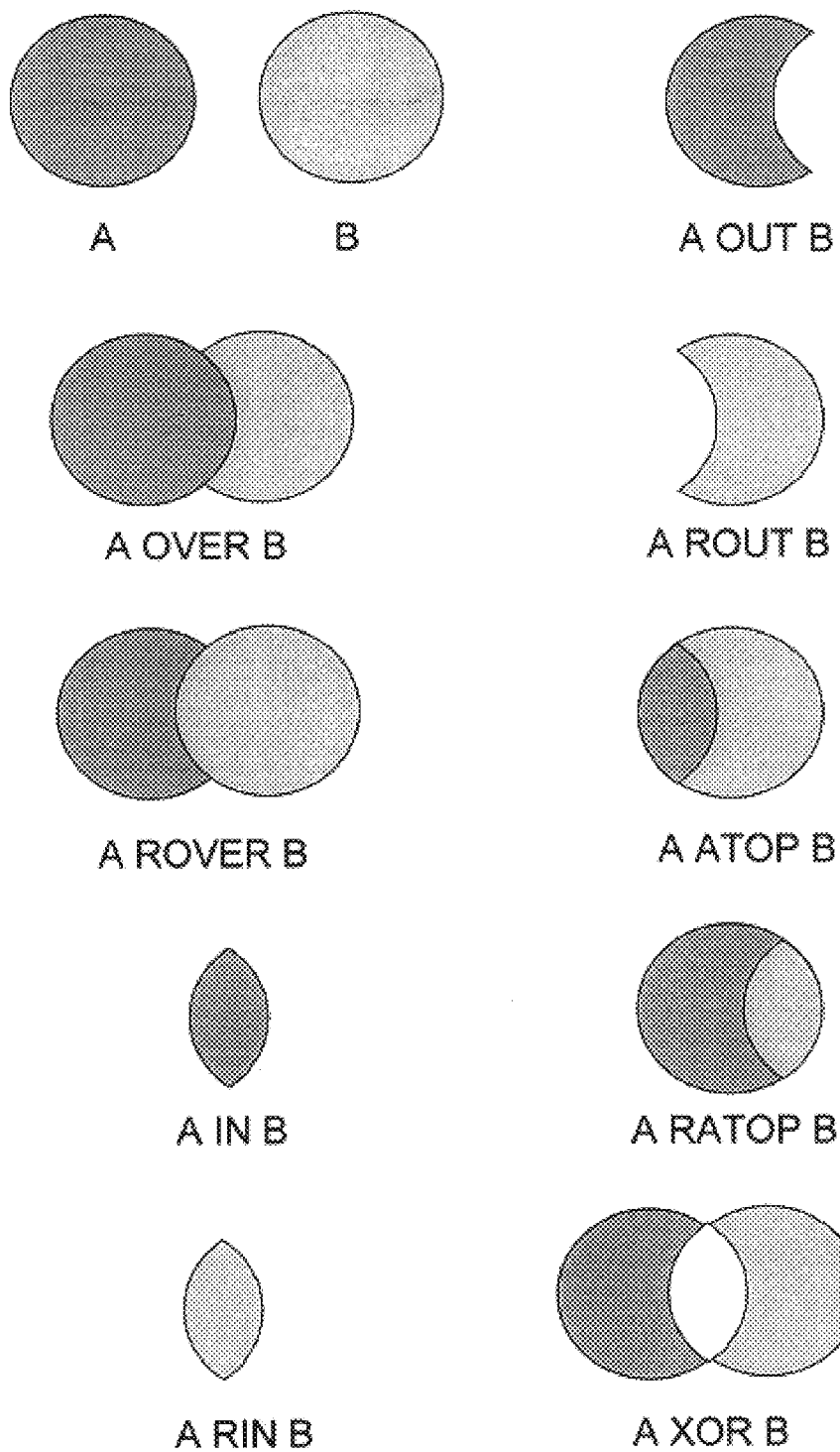
FIG. 6 illustrates examples of compositing operations acting on two portions of an image.

FIG. 6 shows various examples of the final image which is created when various operations as set out in Table 1 are utilized in the compositing of two fully opaque circles A and B. It should be noted that the operators "rover", "rin", "rout" and "ratop" are equivalent to the swapping of the operands to the "r" (reverse) operator and applying the corresponding operator "over", "in", "out" and "atop" respectively.

TABLE 1

Compositing Operations

| OPERATION | EQUATION | |
|---|---|---|
| clear | Dc = 0 | |
| | Do = 0 | |
| A | Dc = Ac | |
| | Do = A0 | |
| B | Dc = Bc | |
| | Do = Bo | |
| A over B | Dc = Ac + Bc (1 − Ao) | |
| | Do = Ao + Bo (1 − Ao) | |
| A rover B | Dc = Ac (1 − Bo) + Bc | (Reverse case of A over B) |
| | Do = Ao (1 − Bo) + Bo | |
| A in B | Dc = AcBo | |
| | Do = AoBc | |
| A rin B | Dc = AoBc | (Reverse case of A over B) |
| | Do = AoBc | |
| A out B | Dc = Ac (1 − Bo) | |
| | Do = Ao (1 − Bo) | |
| A rout B | Dc = Bc (1 − Ao) | (Reverse case of A out B) |
| | Do = Bo (1 − Ao) | |
| A atop B | Dc = AcBo + Bc (1 − Ao) | |
| | Do = AoBo + Bo (1 − Ao) | |
| A ratop B | Dc = Ac (1 − Bo) + BcAo | |
| | Do = Ao (1 − Bo) + BcAo | |
| A Xor B | Dc = Ac (1 − Bo) + Bc (1 − Ao) | |
| | Do = Ao (1 − Bo) + Bo (1 − Ao) | |
| A plus B | Dc = Ac + Bc (with Dc "clamped") | |
| | Do = Ao + Bo (with Do "clamped") | |

An expression tree more complex than that of FIG. 5 can contain a variety of node types including binary compositing operators, unary operators and primitives. Unary operators typically include colour transformations, image convolutions, affine transformations and image warping.

Figure 7:
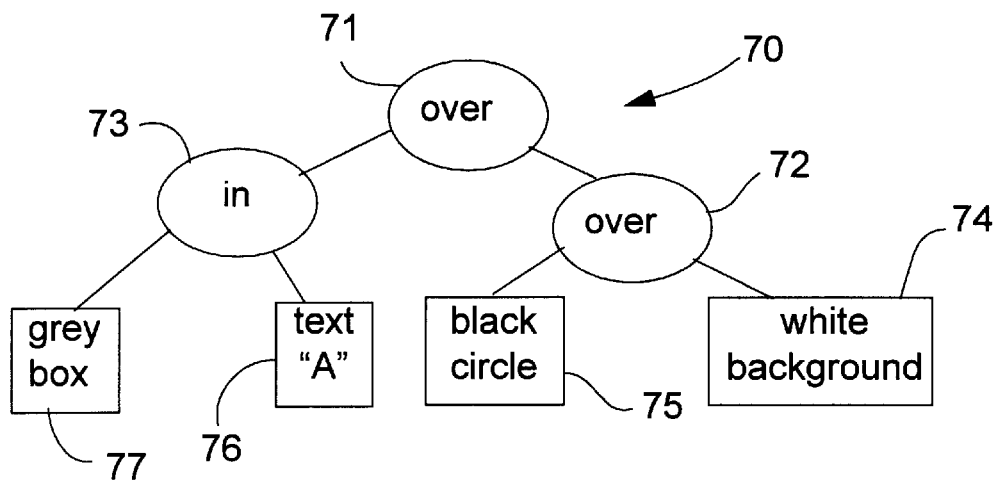
FIG. 7 is another example of an expression tree representation for an image.
Figures 9A, 9B:
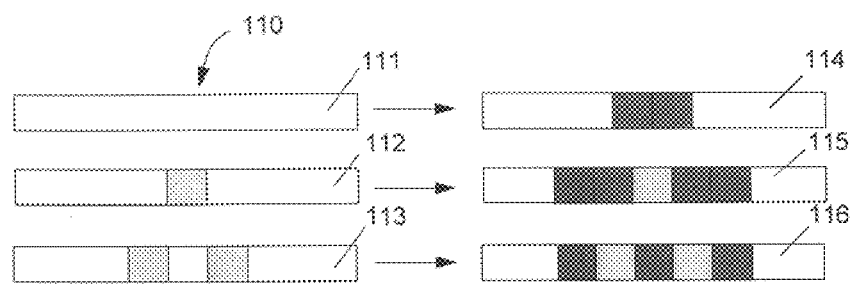
FIG. 9A illustrates the content of a temporary scan line buffer at a plurality of stages of the partial evaluation of the instruction sequence of FIG. 8.
FIG. 9B illustrates a scan line of output image corresponding to the various stages of FIG. 9A.
Figure 10:
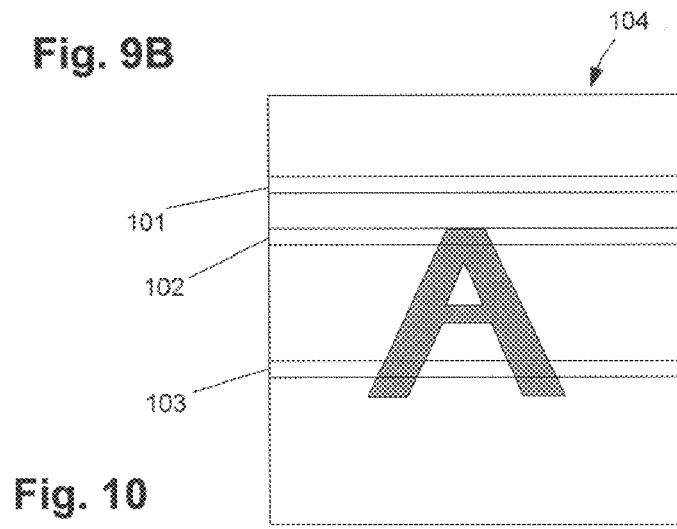
FIG. 10 represents time integrated content of a temporary scan line buffer of FIG. 9A.
Figure 11:
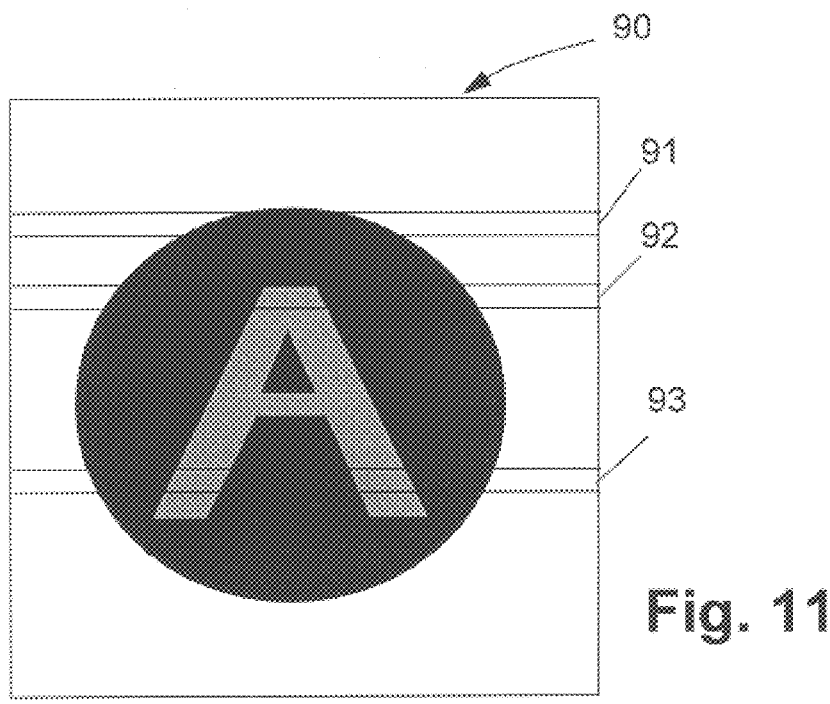
FIG. 11 represents a rendered image in accordance with the expression tree of FIG. 7 or the instruction sequence of FIG. 8.

Turning now to FIGS. 7 to 11, there is illustrated (FIG. 7) an expression tree representation 70, having components 71–77, of an image 90 which is shown in FIG. 11. An alternative representation of FIG. 7 is a sequence of drawing instructions 80–84 set out in FIG. 8. The present example of the alternative representation of FIG. 8 makes reference, at steps 80 and 81, to an intermediate scan line buffer called "Buffer 1" and the content of "Buffer 1" at various stages of rendering the image 90 is shown in FIG. 9A. Steps 82, 83 and 84 each take place within the "main buffer", being that buffer required for generating an output scan line.

Figure 8:
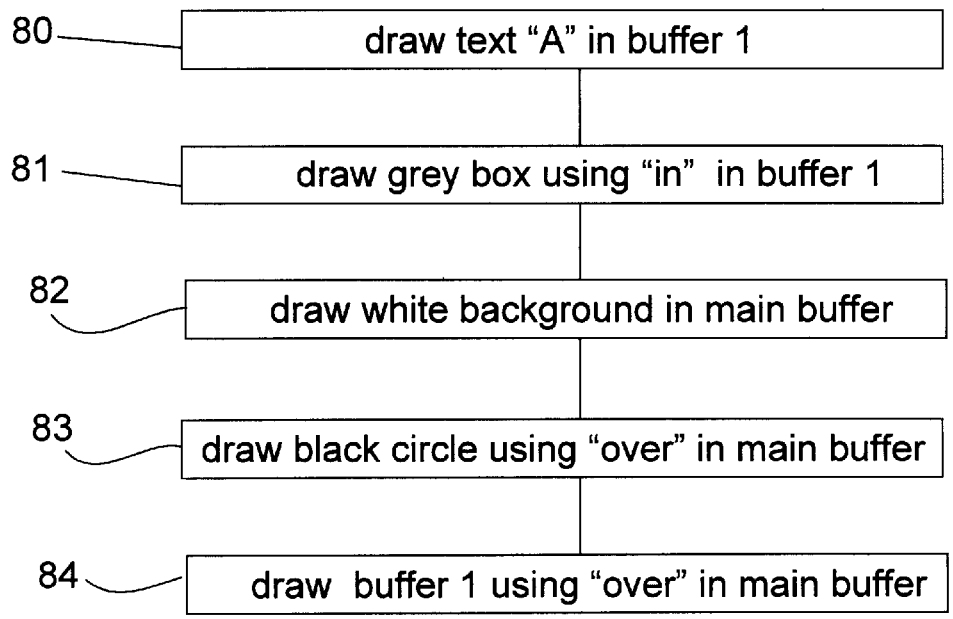
FIG. 8 is an instruction sequence representation of the expression tree representation of FIG. 7.

Referring now to FIGS. 9A and 9B, an example of scan line rendering of the image 90 is shown using an intermediate scan line buffer 110. The intermediate (scan line) buffer 110 is typically of a size capable of storing the equivalent of a single scan line of a rendered image, but optionally may be implemented as a band buffer for a plurality of consecutive scan lines. Typically, an image includes at least many hundreds of scan lines and a single band is generally formed from a plurality of scan lines substantially less than those that occupy the entire image. Accordingly, the intermediate scan line buffer requirements are substantially smaller than those of a frame buffer. Where appropriate or desired, the capacity and/or location of the intermediate scan line buffer may be dynamically re-configurable to optimise image manipulations To scan line render the image 90 through the use, for example, of the instruction sequence of FIG. 8, the intermediate scan line buffer 110 is used in the execution of the instructions to composite a single scan line of the output image.

The instruction sequence of FIG. 8 is repeatedly executed, and at each complete execution of the sequence a scanline of the output image 90 is produced. The content of the intermediate buffer 110 is shown, in FIG. 9A, at three stages 111, 112, and 113 throughout the repeated execution of the instructions of FIG. 8.

A time integrated content of the intermediate scan line buffer 110 ("Buffer 1") is shown in FIG. 10 and represents an image 104 that would have been obtained if the first two drawing instructions 80, 81 were to be executed on a frame buffer. The content of "Buffer 1" 110 is generally not displayed on a display device and is preferably overwritten with each repeat execution of the instruction sequence of FIG. 8. As seen, stage 111 corresponds to a blank portion 101 of the image 104, stage 112 to a portion 102 at the apex of the text character "A", and stage 113 corresponds to a portion 103 within the legs of the text character "A".

FIG. 9B illustrates three rendered scan lines 114, 115 and 116 of the output image 90 corresponding to each of the three stages 111, 112 and 113 of FIG. 9A respectively. In these representations the previously rendered text character "A" is rendered to overlie a black circle as seen in FIG. 11 where the portions 91, 92 and 93 of the output image 90, correspond respectively to the stages 114, 115 and 116.

FIGS. 12 to 18 provide an example of scan line rendering an image represented by an expression tree 120 having components 121–129 (FIG. 12), or an instruction sequence 130 having components 131–136 (FIG. 13), comprising at least one convolution operator 121. In the present example the convolution operator is a "blur" operator 121 which produces a blurring (or diffusion) of an image, or a portion of an image, to which the blur is applied.

Figure 12:
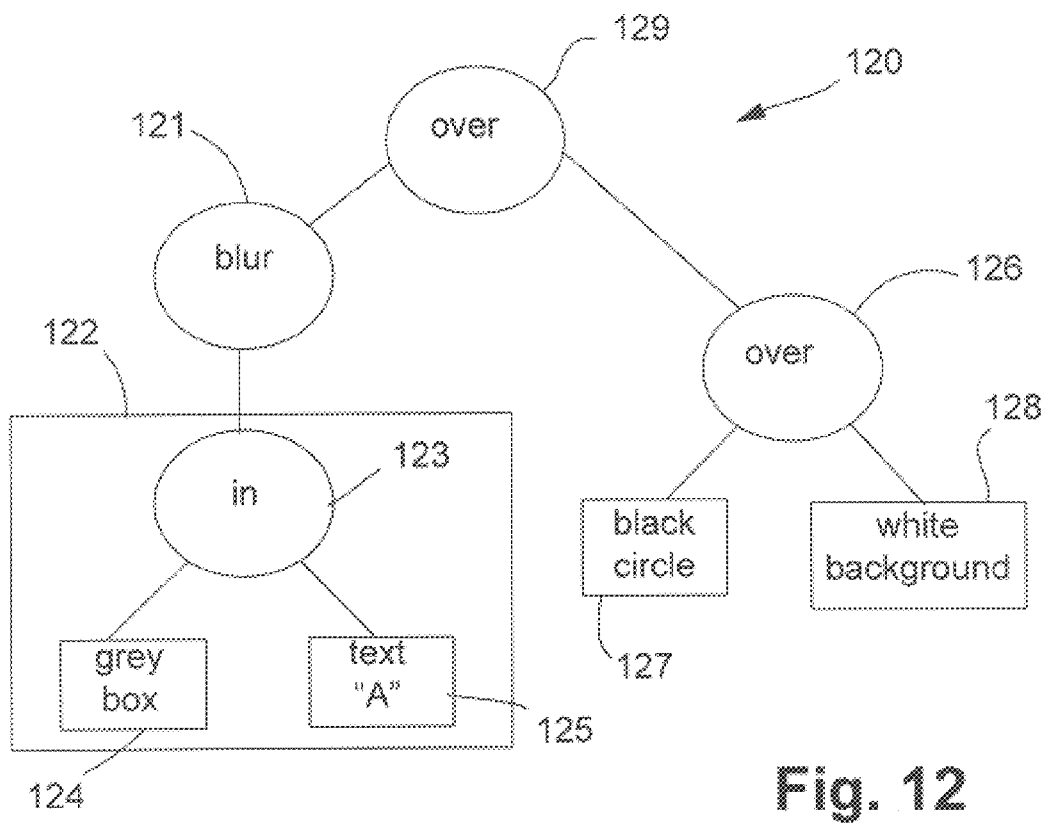
FIG. 12 represents an expression tree representation of an image with a blur convolution operation.
Figure 13:
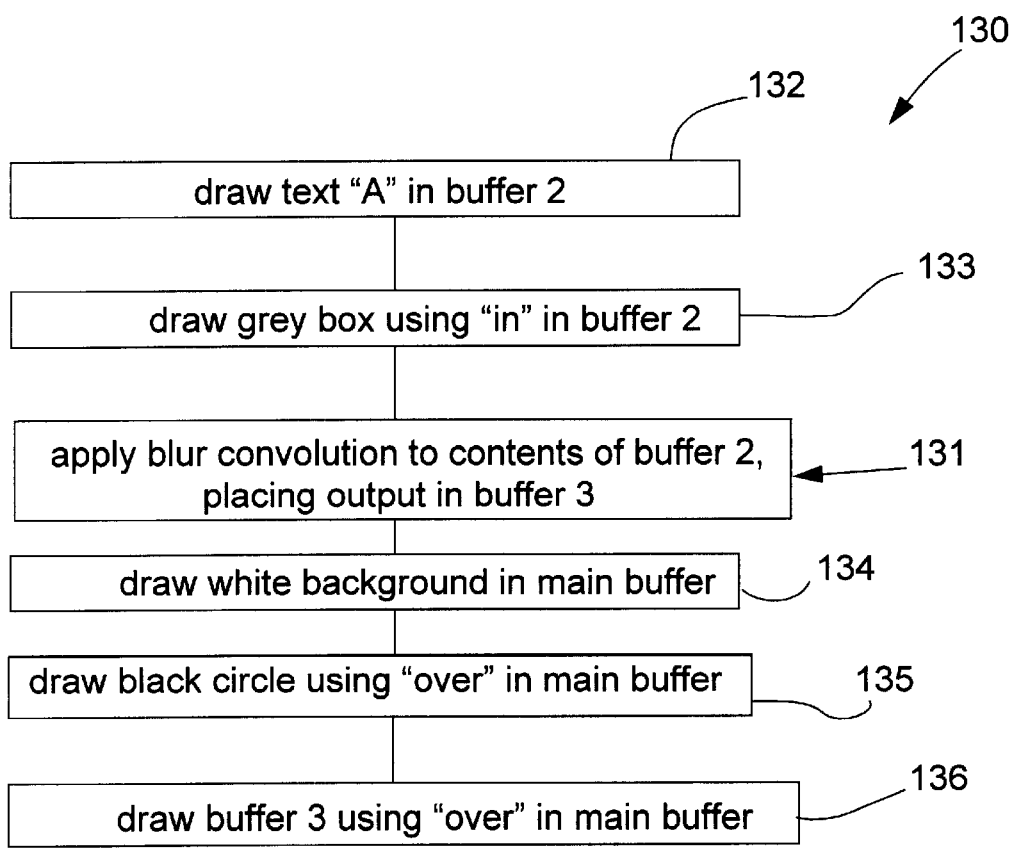
FIG. 13 is corresponding instruction sequence representation of the expression tree representation of FIG. 12.
Figure 14:
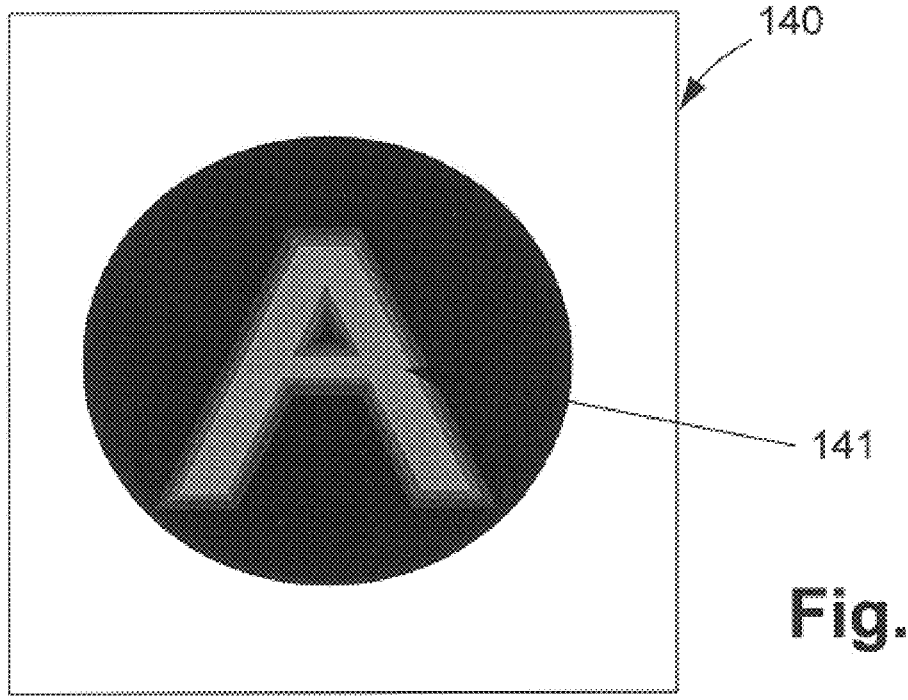
FIG. 14 represents a rendered output image in accordance with the expression tree representation of FIG. 12 or the instruction sequence representation of FIG. 13.

The expression tree 120 of FIG. 12 is substantially similar to the expression tree 70 of FIG. 7, excepting that a "blur" convolution operation 121 has now been introduced as a node of the tree 120. An image 140 represented by the expression tree 120 representation of FIG. 12 is shown in FIG. 14. In the present example an operand of the "blur" operator is a sub-tree 122 comprising, an "in" operator 123 having a first 124 and second 125 primitive as operands.

The sub-tree 122 is convolved with an arbitrary function that blurs a portion of the image 141 represented by the sub-tree 122, in a manner as seen in FIG. 14, where the edges of the text character "A" become blurred or blend into the black circle over which the character lays. In an object-based graphics environment, a convolution operator can be included as part of an expression tree or as one instruction 131 or a sequence of instructions 130 (see FIG. 13) and executed accordingly.

Figure 15:
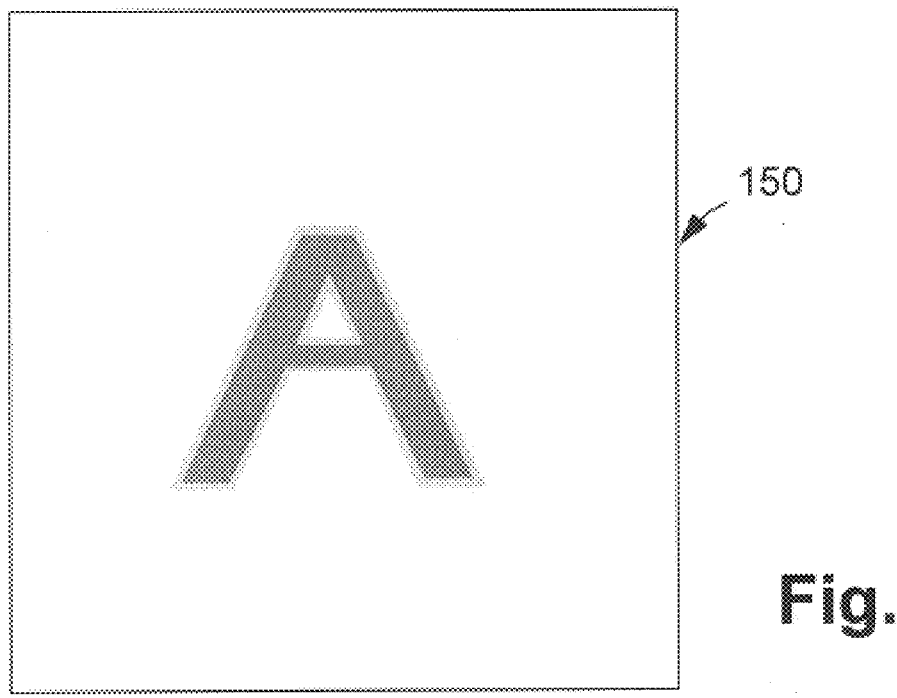
FIG. 15 represents a time integrated content partial evaluation of the instruction sequence of FIG. 13, or expression tree representation of FIG. 12, wherein a blur (convolution) operation has been performed.

To apply a convolution operator in an object-based environment, two intermediate buffers are used in addition to the main buffer. A band buffer ("Buffer 2") having stored therein a portion of an image to which a convolution is to be applied, and a first intermediate scan line buffer ("Buffer 3") to store an output resulting from the application of a convolution to the content of the "Buffer 2". FIG. 15 shows a time integrated content 150 of the first intermediate buffer ("Buffer 3") following the "blur operation" 121, or equivalently after the execution of a blur convolution instruction 131 from the instruction sequence.

Figure 16:
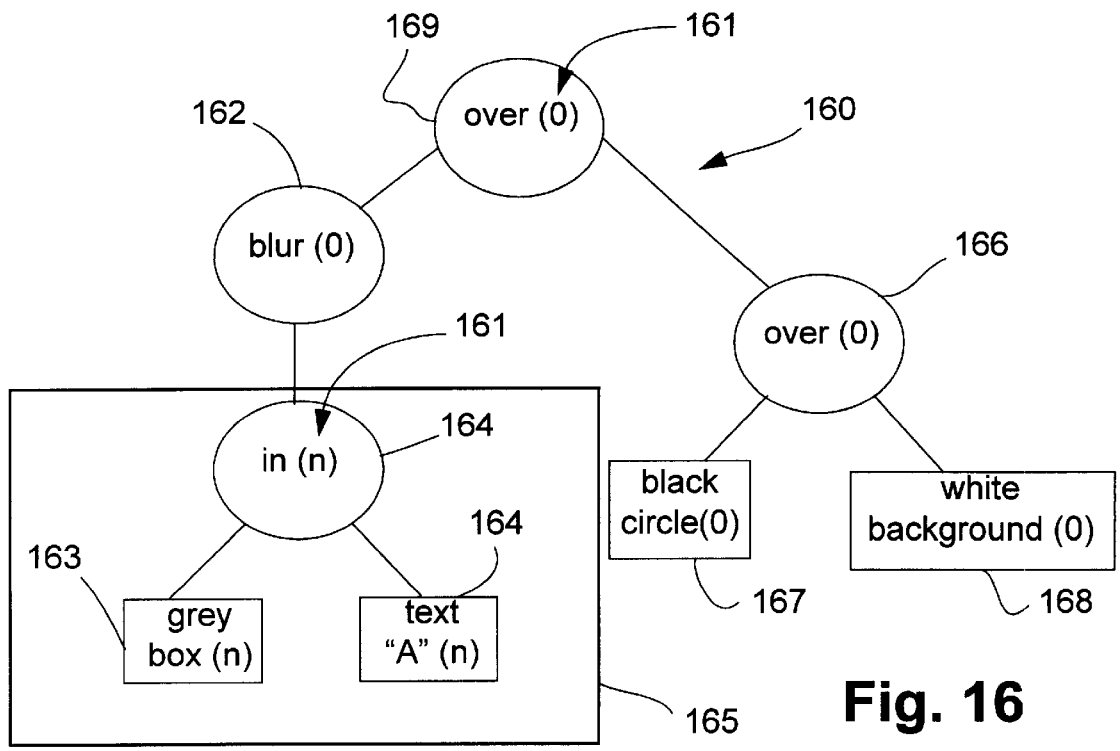
FIG. 16 represents an expression tree representation of the image in FIG. 14 using scan line rendering in accordance with an embodiment of the present invention.

Referring to FIG. 16 there is illustrated an expression tree representation 160 having components 162–169 adapted to scan line rendering. A render number 161, is shown associated with each operator at each internal node 162 and for each primitive at each leaf node 163, representing how many scan lines that node must be rendered in advance of a current scan line of the output buffer. For example, having rendered at least n scan lines before a current scan line, a further n scan lines in advance of the current scan line of a primitive labelled "grey box" and n scan lines in advance of the current scan line of a primitive labelled "text A" are rendered into an intermediate buffer using an "in" operator 164 before a convolution blur 162 operation can be performed on the previous scan lines, current scan line, and n scan lines in advance of the current scan line. Typically, each scan line of the sub-tree is rendered on a scan line by scan line basis, so to render n scan lines in advance of a current line each scan line of the "grey box" and the "text A" is operated on by the "in" operator 164 until n scan lines have been rendered. A total of "2n+1" scan lines of sub-tree 165 require rendering into the intermediate buffer before the convolution operator 162 can be applied, the total "2n+1" scan lines being a minimum number of scan lines requiring rendering before an application of a convolution mask having "2n+1" rows. Furthermore in a scan line rendering system, n of these scan lines must be rendered ahead of the current scan line of the output buffer.

Figure 17:
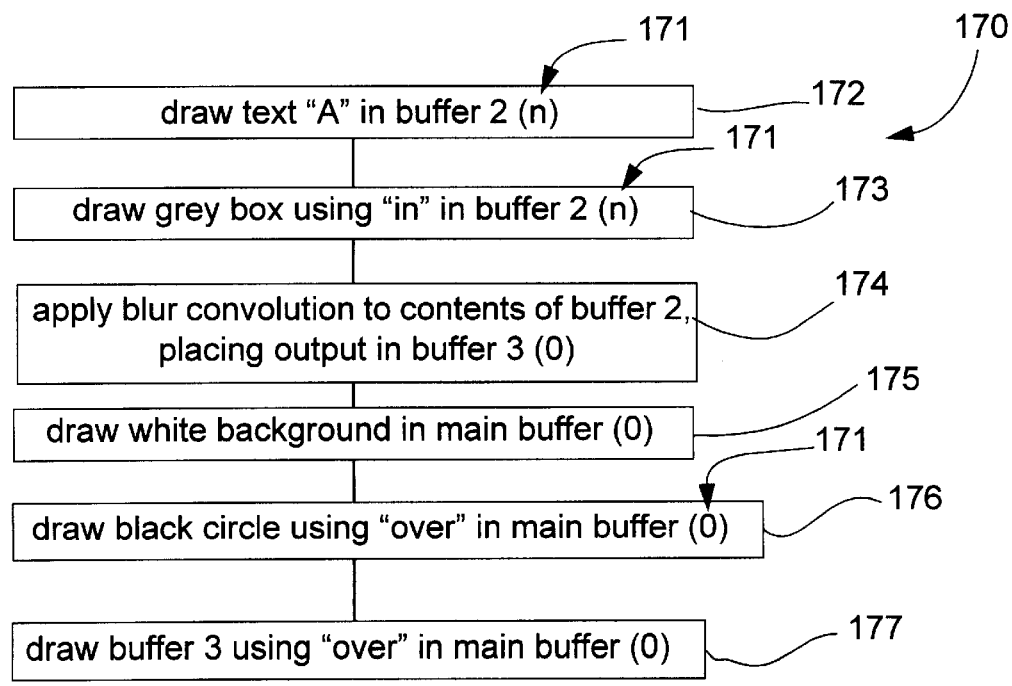
FIG. 17 is a corresponding instruction sequence representation of the expression tree representation of FIG. 16.

FIG. 17 is an instruction sequence 170 representation corresponding to the expression tree representation of FIG. 16. Each instruction 172–177 in the sequence 170 is followed by a number 171 being the instruction sequence representation equivalent of the render number 161 of FIG. 16.

The render number, determining how many scan lines in advance of a current scan line, is subject to cumulative effects of multiple convolution applications. For example, if an operand to a first convolution, with a mask having 2n+1 rows, is a subtree that contains a second convolution operator with a mask having 2m+1 rows, then the operand of the second convolution must be rendered n+m scan lines in advance of a current scan line.

Figures 18A, 18B, 18C:
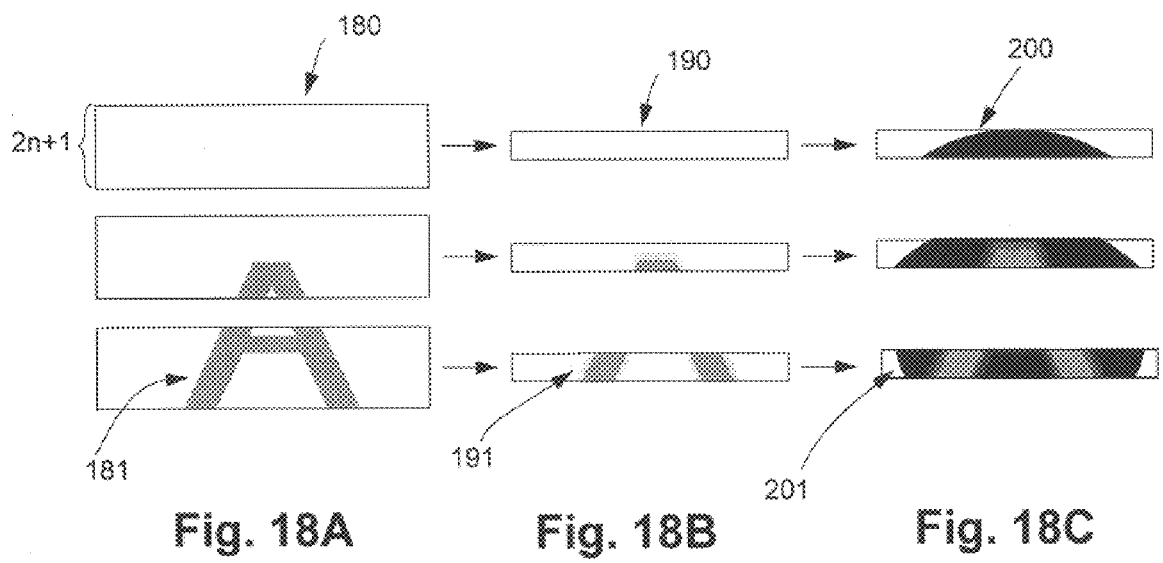
FIG. 18A represents the contents of an input band buffer described in the instruction sequence of FIG. 17 in accordance with the embodiment of the present invention.
FIG. 18B illustrates a temporary scan line buffer and its content following blur (convolution) operation in accordance with the embodiment of the present invention.
FIG. 18C illustrates rendered output image scan lines corresponding to the temporary scan line buffer of FIG. 18B.

Turning now to FIGS. 18A to 18C, there is shown a first intermediate buffer 180 (eg. Buffer 2), capable of storing 2n+1 scan lines, a second intermediate buffer 190 (eg. Buffer 3) capable of storing a single scan line, and an output (main) buffer 200 also capable of storing a single scan line. FIGS. 18A to 18C illustrate various stages of rendering in accordance with the expression tree representation 160 of FIG. 16 or the instruction sequence 170 representation of FIG. 17.

A portion 181 of an image is rendered from subtree 165 of the expression tree representation 160 and a convolution blur 162 is applied to the portion 181 of image to produce a current scan line 191 of the convolution and is placed in second buffer 190. The content of the second buffer 190 is processed together with further nodes of the expression tree 160 to output a current 201 scan line of the image 140.

Every instruction in a sequence, or every operator at nodes of an expression tree, do not necessarily affect every scan line of the final image. In this case an "active list" of instructions that preferably affect only a current scan line is desirable. As each scan line is generated, instructions that affect the current scan line are added to the active list, while those that do not are removed. In this manner, the time required to produce an output image is often considerably reduced.

Preferably, the method is implemented on horizontal scan lines of an image and the image is rendered accordingly. However, the process can be implemented on vertical scan lines of an image and rendered accordingly without departing from the scope or spirit of the invention.

Figure 19:
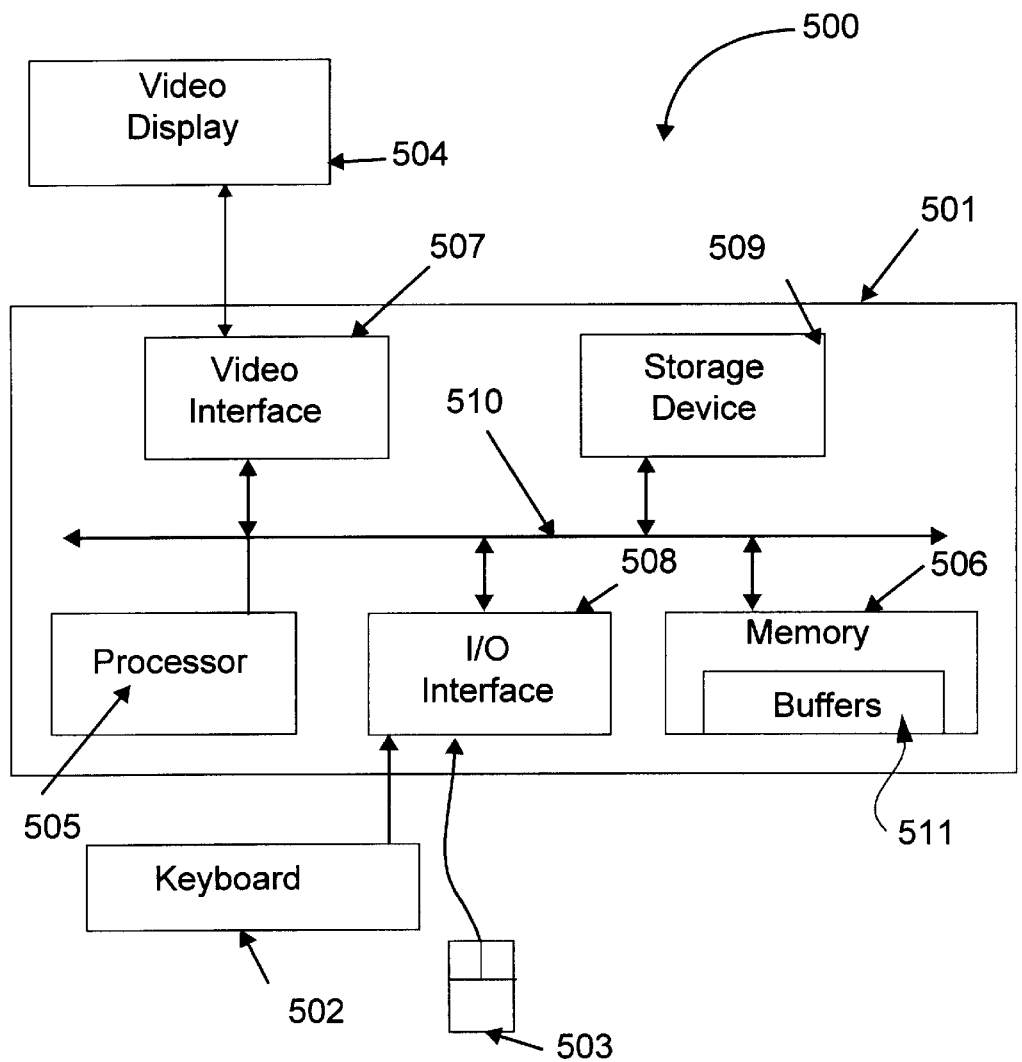
FIG. 19 is a schematic representation of a computer system with which the embodiments may be performed.

The embodiment of the invention can preferably be practised using a conventional general-purpose computer, such as that shown in FIG. 19, wherein the process described with reference to FIG. 4 to FIG. 18 is implemented as software executed on the computer. The computer 500 comprises the computer module 501, input devices such as a keyboard 502 and mouse 503, and a display device 504.

The computer module 501 comprises at least one processor unit 505, a memory unit 506 which typically includes semiconductor random access memory (RAM) and read only memory (ROM), input/output (I/O) interfaces including a video interface 507 and keyboard interface 508. A storage means 509 is provided and can include one or more of the following devices: a floppy disk, a hard disk drive, a CD-ROM drive or similar a non-volatile storage device known to those skilled in the art. The components 505 to 509 of the computer module 501, typically communicate via an interconnected bus 510 and in a manner which results in a usual mode of operation of the computer 500 known to those in the relevant art. Examples of computers on which the embodiments can be practised include IBM-PC/ATs and compatibles, Sun Sparcstations or a like computer system. FIG. 19 also shows line/band buffers 511 provided within the memory 506 to enable the scan line rendering and convolutions disclosed above. The buffers 511 have a limited capacity and thus do not occupy free memory that would otherwise be used by a frame buffer to perform similar functions. The buffers 511 are arranged to retain pixel data of scan lines and in the preferred embodiment have a capacity to retain bands each having a plurality of scan lines. It should be noted that the buffers 511 may reside at fixed locations within the memory 506 or alternatively be dynamically re-configurable in location and/or size and accessible by a virtual memory addressing scheme or by memory swapping. For example, with a pixel based image or in the graphical example of FIG. 16 only a single convolution process (blur 162) takes place which may be performed in a single buffer. However, for graphical renderings that involve more than one convolution (for example if a blur operation were inserted into the expression tree 160 between the over operators 166 and 169) a number of intermediate buffers may be used to complement substantially simultaneous rendering of the graphical objects, their individual convolutions and the subsequent combining using the over operator 169.

Embodiments of the present invention may be exercised in a single computer 500 or alternately in a system containing a plurality of computers, such as a computer network (eg. local area network, Internet). Specifically, the embodiments may be attained by supplying one or more programs to the computer(s) directly via a storage medium such as a floppy disk or optical disk, or indirectly via the computer network. In either case, the program may be stored for use in the storage device 509 for subsequent reading by the processor 505 and implementation in concert with the memory 506 and buffers 511. Further the finite convolution mask may be supplied with the programs, separately from the programs, and/or stored in the storage device 509 ready for subsequent use, whereupon the mask may be accessed and temporarily retained in the memory 506 for convolving with the image data. Alternatively, the finite convolution matrix may be dynamically generated with an execution of the program/application. According to a mode of operating the computer system 500, such programs are typically executed by the processor unit 505 which is operable to transfer pixel-based image data to and from the buffers 511 as well as render in a pixel-based image data from graphical objects. In the latter case, the rendering may take place directly into the buffers 511.

The foregoing only describes one embodiment of the present invention, however, modifications and/or changes can be made thereto by a person skilled in the art without departing from the scope of the invention. For example, an alternative hierarchal data representation such as direct acyclic graph (DAG) can be used.

What is claimed is:

1. A method of applying an operator having a finite mask to at least one object selected from a plurality of individually manipulable graphical objects in an image, the image being represented in an object-based graphics environment, said method comprising the steps of:

(a) providing an expression tree representation of the image, the expression tree comprising a plurality of nodes;

(b) associating a render number with at least one of the nodes, the or each render number specifying a number of scan lines to be rendered in advance of a current scan line for the associated node;

(c) providing the finite mask having a plurality of coefficients, wherein the coefficients are arranged in a predetermined number of rows and a predetermined number of columns;

(d) providing a buffer means adapted to store a portion of the at least one object in the image;

(e) rendering to the buffer means at least a predetermined number of scan lines of the at least one object in the image substantially equal to the number of rows or the number of columns of the mask; and (f) applying the mask to the rendered plurality of scan lines to produce a scan line of an output image.

2. A method according to claim 1, wherein steps (e) and (f) are repeated to produce a plurality of scan lines of the output image, wherein in the rendering step (e) a scan line is discarded and a next scan line is rendered for each scan line of the output image.

3. A method according to claim 1, wherein the nodes are characterised as being either an operator or a primitive.

4. A method according to claim 1, wherein the coefficients of the mask are determined by an arbitrary function.

5. A method as in claim 1, wherein said number of scan lines in advance is related to the number of rows or number of columns of said operator.

6. A method as in claim 5, wherein there are a plurality of operators, and wherein said number of scan lines in advance is related to the cumulative effect of all the operators that apply to the node.

7. A method as claimed in claim 1, wherein the mask is a convolution mask.

8. A method as claimed in claim 1, wherein said predetermined number of scan lines includes at least one scan line rendered in advance of a current scan line.

9. A method of applying an operator having a finite mask to at least one object selected from a plurality of individually manipulable graphical objects in an image, the image being represented in an object-based graphics environment, said method comprising the steps of:

(a) providing an instruction sequence representation of the image:

(b) associating a render number with at least one instruction in the instructing sequence, the or each render number specifying a number of scan lines to be rendered in advance of a current scan line for the associated instruction;

(c) providing the finite mask having a plurality of coefficients, wherein the coefficients are arranged in a predetermined number of rows and a predetermined number of columns;

(d) providing a buffer means adapted to store a portion of the at least one object in the image;

(e) rendering to the buffer means at least a predetermined number of scan lines of the at least one object in the image substantially equal to the number of rows or the number of columns of the mask; and (f) applying the mask to the rendered plurality of scan lines to produce a scan line of an output image.

10. A method according to claim 9, wherein a subset of said instruction sequence is assembled for the current scan line, said subset consisting only of those instructions which affect the current scan line.

11. A method as in claim 9, wherein said number of scan lines in advance is related to the number of rows or number of columns of said convolution operator.

12. A method as in claim in claim 11, wherein there are a plurality of operators, and wherein said number of scan lines in advance is related to the cumulative effect of all the operators that apply to the node.

13. A method as claimed in claim 9, wherein the mask is a convolution mask.

14. A method of rendering an image in an object-based graphics environment, the image being rendered by applying rendering operations to at least one object selected from a plurality of individually manipulable graphical objects in the image, wherein at least one said rendering operation is defined by a finite mask comprising a plurality of coefficients arranged in a predetermined number of rows and a predetermined number of columns, said method including the steps of:

(a) providing an expression tree representation of the image, the expression tree comprising a plurality of nodes;

(b) associating a render number with at least one of the nodes, the or each render number specifying a number of scan lines to be rendered in advance of a current scan line for the associated node;

(c) providing a buffer means for storing a portion of an input to the operation, wherein the portion comprises at least a predetermined number of scan lines of input data, the predetermined number of scan lines substantially equaling at least one of the number of columns or number of rows of the mask;

(d) applying the finite mask to the stored portion in the buffer means to produce a scan line of output that corresponds to the stored input portion; and (e) utilizing the scan line of output in at least one subsequent said rendering operation for rendering the image.

15. A method according to claim 14, further comprising repeating steps (c) and (d) to produce a plurality of scan lines of output, wherein in step (c), a scan line is discarded and a next scan line is provided for each scan line of output.

16. A method according to claim 14, wherein the nodes are each selected from the group consisting of an operator and a primitive.

17. A method according to claim 14, wherein the coefficients of the mask are determined by an arbitrary function.

18. A method according to claim 14, wherein the buffer means is configured to retain a limited portion of the image substantially smaller than an entirety of the image.

19. A method as claimed in claim 14, wherein said mask is a convolution mask.

20. A method as claimed in claim 17, wherein the mask is a convolution mask.

21. A method as claimed in claim 14, wherein said predetermined number of scan lines includes at least one scan line rendered in advance of a current scan line.

22. A method of rendering an image in an object-based graphics environment, the image being rendered by applying rendering operations to at least one object selected from a plurality of individually manipulable graphical objects in the image, wherein at least one the rendering operation is defined by a finite mask comprising a plurality of coefficients arranged in a predetermined number of rows and a predetermined number of columns, said method including the steps of:

(a) providing an expression tree representation of the image, the expression tree comprising a plurality of nodes, wherein one or more said nodes have associated therewith a render number that specifies the number of scan lines to be rendered in advance of a current scan line;

(b) storing a portion of the at least one object in a buffer means, wherein the portion comprises at least a predetermined number of rendered scan lines of input data, the predetermined number of rendered scan lines substantially equaling at least one of the number of rows or the number of columns of the finite mask;

(c) applying the finite mask to the stored portion in the buffer means to produce a scan line of output that corresponds to the stored input portion;

(d) utilising the scan line of output in at least one subsequent said rendering operation for rendering the image; and (e) repeating steps (b) and (c) to produce a plurality of scan lines of output, wherein in step (b) a scan line is discarded from the buffer means and a next scan line is provided for each scan line of output.

23. A method as claimed in claim 22, wherein the mask is a convolution mask.

24. A method as claimed in claim 22, wherein said predetermined number of scan lines includes at least one scan line rendered in advance of a current scan line.

25. Apparatus for applying an operator having a finite mask to at least one object selected from a plurality of individually manipulable graphical objects in an image, said image being represented in an object-based graphics environment, said apparatus comprising:

means for providing an expression tree representation of the image, the expression tree comprising a plurality of nodes;

means for associating, a render number with at least one node of the expression tree, the or each render number with at least one node of the expression tree, the or each render number specifying a number of scan lines to be rendered in advance of a current scan line for the associated node;

first means for providing said finite mask having a plurality of coefficients, wherein said coefficients are arranged in a predetermined number of rows and a predetermined number of columns;

buffer means adapted to store a portion of the at least one object in the image;

second means for rendering to said buffer means at least a predetermined number of scan lines of said at least one object in said image, said predetermined number of scan lines being substantially equal to the number of rows or the number of columns of said finite mask; and third means for applying the finite mask to said plurality of scan lines to produce a scan line of an output image.

26. Apparatus according to claim 25, wherein for each scan line of said output image produced, said second means discards a previously rendered scan line from said buffer means and provides a further scan line of said input image to said buffer means.

27. Apparatus according to claim 26, wherein said buffer means is sized to store at least two scan lines of the at least one object in the image and said second means provides said scan lines of the at least one object in the image to said buffer means in line-by-line order.

28. Apparatus according to claim 27, wherein said buffer means is sized to store at least a band of scan lines of the at least one object in the image and said second means provides said scan lines of the at least one object in the image to said buffer means in band-by-band order, with a scan line of said band of the image being discarded from said buffer means after convolving with said mask to produce a scan line of said output image.

29. Apparatus according to claim 25, wherein said nodes are each selected from the group consisting of an operator and a primitive.

30. Apparatus according to claim 25, wherein the coefficients of the mask are determined by an arbitrary function.

31. Apparatus according to claim 25, wherein each of said buffer means and said second an third means comprise components of a computer system, said components including a processor of said computer system.

32. Apparatus as claimed in claim 25, wherein said operator is a convolution operator and the mask is a convolution mask.

33. Apparatus as claimed in claim 30, wherein the mask is a convolution mask.

34. Apparatus as claimed in claim 25, wherein said predetermined number of scan lines includes at least one scan lie rendered in advance of a current scan line.

35. Apparatus for applying an operator having a finite mask to at least one object selected from a plurality of individually manipulable graphical objects in an image, said image being represented in an object-based graphics environment, said apparatus comprising:

means for providing an instruction sequence representation, of the image;

means for associating a render number with at least one instruction in said instruction sequence, the or each render number specifying a number of scan lines to be rendered in advance of a current scan line for the instruction;

first means for providing said finite mask having a plurality of coefficients, wherein the coefficients are arranged in a predetermined number of rows and a predetermined number of columns;

buffer means adapted to store a portion of the at least one object in the image;

second means for rendering to said buffer means at least a predetermined number of scan lines of the at least one object in the image, said predetermined number of scan lines being substantially equal to the number of rows or the number of columns of said finite mask; and third means for applying the finite mask to said plurality of scan lines to produce a scan line of an output image.

36. A computer program product comprising a computer readable medium having a computer program recorded thereon for applying an operator having a finite mask to at least one object selected from a plurality of individually manipulable graphical objects in an input image, the input image being represented in an object-based graphics environment, said computer program comprising:

code for providing an expression tree representation of the image, the expression tree comprising a plurality of nodes, wherein one or more nodes of the expression tree have associated therewith a render number that specifies the number of scan lines to be rendered in advance of a current scan line for the associated node;

code for providing the finite mask having a plurality of coefficients, wherein the coefficients are arranged in a predetermined number of rows and a predetermined number of columns;

code for rendering to a buffer means adapted to store a portion of said at least one object in said image at least a predetermined number of scan lines of the at least one object in the image substantially equal to the number of rows or the number of columns of the finite mask; and code for applying the finite mask to said rendered plurality of scan lines to produce a scan line of an output image.

37. A computer program product according to claim 36, wherein said computer readable medium includes a disk storage device.

38. A computer program product according to claim 36, wherein said computer readable medium includes a computer network.

39. A computer program product as claimed in claim 36, wherein said operator is a convolution operator and the mask is a convolution mask.

40. A computer program product as claimed in claim 36, wherein said predetermined number of scan lines includes at least one scan line rendered in advance of a current scan line.

41. A computer program product comprising a computer readable medium having a computer program recorded thereon for rendering an image in an object-based graphics environment, the image being represented by an expression tree representation comprising a plurality of nodes, wherein one or more of the nodes have associated therewith a render number that specifies the number of scan lines to be rendered in advance of a current scan line, the image being rendered by applying rendering operations to at least one object selected from a plurality of individually manipulable graphical objects in the image, wherein at least one said rendering operation is defined by a finite mask comprising a plurality of coefficients arranged in a predetermined number of rows and a predetermined number of columns, said computer program comprising:

means for storing a portion of the at least one object in a buffer, wherein the portion comprises at least a predetermined number of rendered scan lines of input data, said predetermined number of rendered scan lines substantially equaling at least one of the number of columns or number of rows of said finite mask;

first means for applying the convolution mask to the stored portion in said buffer to produce a scan line of output that corresponds to the stored input portion; and second means for utilising said scan line of output in at least one subsequent said rendering operation for rendering the image.

* * * * *

UNITED STATES PATENT AND TRADEMARK OFFICE
CERTIFICATE OF CORRECTION

PATENT NO.    : 6,580,836 B2
DATED         : June 17, 2003
INVENTOR(S)   : George Politis It is certified that error appears in the above-identified patent and that said Letters Patent is hereby corrected as shown below:

<u>Title page,</u>
Item [75], Inventor, "New South Wales" should read -- Macquarie Fields --.
Item [56], References Cited, U.S. PATENT DOCUMENTS, "5,838,229  11/1998 Smith et al." should read -- 5,838,299 11/1998 Smith et al. --.

<u>Column 3,</u>
Line 13, "represented" should read -- representing --; and
Line 13, "least graphical" should read -- least a graphical --.

<u>Column 5,</u>
Line 45, "object based" should read -- object-based --.

<u>Column 7,</u>
Line 1, "manipulations" should read -- manipulations. --; and
Line 1, "render" should read -- rendering --.

<u>Column 11,</u>
Line 21, "in claim" (second occurrence) should be deleted.

<u>Column 12,</u>
Line 12, "the" should read -- of the --.

<u>Column 13,</u>
Line 29, "an" should read -- and --; and
Line 39, "lie" should read -- line --.

Signed and Sealed this

Twenty-fourth Day of February, 2004

JON W. DUDAS
*Acting Director of the United States Patent and Trademark Office*